(12) United States Patent
Suzuki et al.

(10) Patent No.: US 7,398,202 B2
(45) Date of Patent: Jul. 8, 2008

(54) INFORMATION PROCESSING APPARATUS, INFORMATION PROCESSING METHOD AND INFORMATION PROCESSING PROGRAM

(75) Inventors: Masaharu Suzuki, Tokyo (JP); Sadanobu Takane, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 906 days.

(21) Appl. No.: 10/730,287

(22) Filed: Dec. 9, 2003

(65) Prior Publication Data
US 2005/0060141 A1 Mar. 17, 2005

(30) Foreign Application Priority Data
Dec. 12, 2002 (JP) ............... 2002-360352

(51) Int. Cl.
*G06F 17/27* (2006.01)
*G06F 17/21* (2006.01)
(52) U.S. Cl. .................. 704/9; 704/10
(58) Field of Classification Search ............ 704/9, 704/10
See application file for complete search history.

(56) References Cited

U.S. PATENT DOCUMENTS

| 5,056,021 | A | * | 10/1991 | Ausborn | 704/9 |
| 5,099,426 | A | * | 3/1992 | Carlgren et al. | 704/9 |
| 5,122,951 | A | * | 6/1992 | Kamiya | 704/9 |
| 5,384,703 | A | * | 1/1995 | Withgott et al. | 715/531 |
| 6,006,221 | A | * | 12/1999 | Liddy et al. | 707/5 |
| 6,845,354 | B1 | * | 1/2005 | Kuo et al. | 704/9 |
| 7,031,910 | B2 | * | 4/2006 | Eisele | 704/10 |
| 2002/0026435 | A1 | * | 2/2002 | Wyss et al. | 707/1 |
| 2002/0052730 | A1 | * | 5/2002 | Nakao | 704/10 |
| 2002/0128820 | A1 | * | 9/2002 | Goronzy et al. | 704/10 |

(Continued)

FOREIGN PATENT DOCUMENTS

JP 2000-172691 6/2000

(Continued)

OTHER PUBLICATIONS

Katsuya Mimuro, "Kigyo Kachi o Sozo suru VBIT", Chiteki Sisan Sozo, Nomura Research Institute, Ltd., Aug. 20, 2002, vol. 10, No. 8, pp. 44-53.

(Continued)

*Primary Examiner*—Patrick N. Edouard
*Assistant Examiner*—Douglas C Godbold
(74) *Attorney, Agent, or Firm*—Arent Fox LLP.

(57) ABSTRACT

The invention makes it possible to detect the characteristics of text data, and to analogize potential hidden meaning in the text data.

A word-cutting unit 3 performs a word-cutting process on the text data input from the input unit 1, a syntax-analysis unit 4 performs syntax analysis and a thesaurus-creation unit 5 creates thesauruses from the results, then after performing word cutting and syntax analysis again, a thesaurus-sorting unit 7 performs sorting, and a frequency-of-appearance unit calculates the frequency of appearance of the thesauruses, a correlation-coefficient-calculation unit 11 calculates correlation coefficients between thesauruses, a correlation-coefficient-total-calculation unit 13 for each thesaurus calculates the total of the correlation coefficients for each thesaurus, the graph-creation-display unit 15 creates a graph based on the frequency of appearance and total of the correlation coefficients for each thesaurus.

2 Claims, 7 Drawing Sheets

U.S. PATENT DOCUMENTS

2004/0088156 A1* 5/2004 Kanagasabai et al. .......... 704/9
2005/0154690 A1* 7/2005 Nitta et al. .................... 706/46

FOREIGN PATENT DOCUMENTS

| | | |
|---|---|---|
| JP | 2000-242662 | 9/2000 |
| JP | 2001-101194 | 4/2001 |
| JP | 2002-117035 | 4/2002 |
| JP | 2002-183175 | 6/2002 |
| JP | 2002-230006 | 8/2002 |

OTHER PUBLICATIONS

Katsuya Mimuro, "Kokyaku no Koe' o Shisanka suru Text Mining", Chiteki Sisan Sozo, Nomura Research Institute, Ltd., Jun. 1, 2001, vol. 9, No. 6, pp. 74-77.

* cited by examiner

Fig 3

| Last week | Order | Deliver | Parts | Contact | --- |
|---|---|---|---|---|---|
| a week ago | ordered but | deliver | parts | information | --- |
| | | | | | |

Fig 4

|  | Last week | Order | Deliver | Parts | ------ |
|---|---|---|---|---|---|
| K-1 | 0 | 1 | 0 | 1 | ------ |
| K-2 | 1 | 1 | 1 | 0 | ------ |
| K-3 | 1 | 1 | 0 | 0 | ------ |
| ⋮ | ⋮ | ⋮ | ⋮ | ⋮ | ⋮ |
| K-n | 1 | 1 | 0 | 1 | ------ |

Fig 5

|  | Last week | Order | Deliver | Parts | ---- |
|---|---|---|---|---|---|
| Last week | 1 | 0.025 | 0.038 | 0.001 | ---- |
| Order | 0.025 | 1 | 0.064 | 0.021 | ---- |
| Deliver | 0.038 | 0.064 | 1 | 0.004 | ---- |
| Parts | 0.001 | 0.021 | 0.004 | 1 | ---- |
| ⋮ | ⋮ | ⋮ | ⋮ | ⋮ | ⋮ |
| Total | | | | | |

Fig 6

|   | Last week | Order | Deliver | Parts | ----- |   |
|---|---|---|---|---|---|---|
| K-1 | 0 | 1 | 0 | 1 | ----- |   |
| K-2 | 1 | 1 | 1 | 0 | ----- |   |
| K-3 | 1 | 1 | 0 | 0 | ----- |   |
| ⋮ | ⋮ | ⋮ | ⋮ | ⋮ | ⋮ |   |
| K-n | 1 | 1 | 0 | 1 | ----- |   |
| Total | A | B | C | D | ----- | $\Sigma(A+B+C+D\cdots)$ |

INFORMATION PROCESSING APPARATUS, INFORMATION PROCESSING METHOD AND INFORMATION PROCESSING PROGRAM

DETAILED DESCRIPTION OF THE INVENTION

1. Field of the Invention

This invention relates to an information-processing apparatus, information-processing method and information-processing program, and more particularly to an information-processing apparatus, information-processing method and information-processing program that creates thesauruses based on text data and finds the correlation between thesauruses.

2. Description of the Related Art

There is a method in which the results of the total number of times words appear is referenced, and words whose frequency of appearance exceed a set value are extracted from among the cut out words, then the correlation between the extracted words is evaluated and a cluster of co-occurring words, whose correlation is greater than a set value, is created. When doing this, by creating a category dictionary that corresponds to the text that is the object of analysis, it is possible to display the analysis results of that text. (For example, refer to patent document 1.)

[Patent Document 1]
Japanese patent Publication No. 2001-101194 (FIG. 1)

SUMMARY OF THE INVENTION

Problem to be Solved By the Invention

However, there was a problem in that it was not possible to detect the characteristics of the text data based on the correlation between keywords extracted from the text data.

The present invention takes into consideration the condition described above and makes it possible to detect the characteristics of the text data based on the correlation between keywords extracted from the text data.

Means for Solving the Problem

The information-processing apparatus of claim 1 comprises: an input unit that inputs text data; a text-data-memory unit that stores text data; a word-cutting unit that executes a word-cutting process on text data; a syntax-analysis unit that performs a syntax-analysis process on the text data on which the word-cutting process was performed; a thesaurus-creation unit that creates thesauruses from the text data on which the syntax-analysis process was performed; a thesaurus-memory unit that stores the thesauruses created by the thesaurus-creation unit; a thesaurus-sorting unit that performs a sorting process on the text data on which word-cutting and syntax-analysis were performed; a sorting-results-memory unit that stores the sorting results from the thesaurus-sorting unit; a frequency-of-appearance-calculation unit that calculates the frequency of appearance for each thesaurus based on the sorting results stored by the sorting-results-memory unit; a frequency-of-appearance-memory unit that stores the results calculated by the frequency-of appearance-calculation unit; a correlation-coefficient-calculation unit that calculates correlation coefficients between thesauruses; a correlation-coefficient-memory unit that stores the correlation coefficients between thesauruses that were calculated by the correlation-coefficient-calculation unit; a correlation-coefficient-total-calculation unit for each thesaurus that calculates the total of the correlation coefficients for each thesaurus; a correlation-coefficient-total-memory unit for each thesaurus that stores the total of the correlation coefficients for each thesaurus calculated by the correlation-coefficient-total-calculation unit for each thesaurus; and a graph-creation-display unit that creates and displays a graph based on the frequency of appearance stored by the frequency-of-appearance-memory unit and the correlation-coefficient totals for each thesaurus stored by the correlation-coefficient-total-memory unit for each thesaurus; and wherein the word-cutting unit and syntax-analysis unit perform the word-cutting process and syntax-analysis process again based on the thesauruses created by the thesaurus-creation unit.

The information-processing method of claim 2 comprises: an input step of inputting text data; a text-data-memory step of storing text data; a word-cutting step of executing a word-cutting process on text data; a syntax-analysis step of performing a syntax-analysis process on the text data on which the word-cutting process was performed; a thesaurus-creation step of creating thesauruses from the text data on which the syntax-analysis process was performed; a thesaurus-memory step of storing the thesauruses created in the thesaurus-creation step; a word-cutting and syntax-analysis step of performing the word-cutting process and syntax-analysis process again based on the thesauruses stored in the thesaurus-memory step; a thesaurus-sorting step of performing a sorting process on the text data on which word-cutting and syntax-analysis were performed; a sorting-results-memory step of storing the sorting results from the thesaurus-sorting step; a frequency-of-appearance-calculation step of calculating the frequency of appearance for each thesaurus based on the sorting results stored in the sorting-results-memory step; a frequency-of-appearance-memory step of storing the results calculated in the frequency-of appearance-calculation step; a correlation-coefficient-calculation step of calculating correlation coefficients between thesauruses; a correlation-coefficient-memory step of storing the correlation coefficients between thesauruses that were calculated in the correlation-coefficient-calculation step; a correlation-coefficient-total-calculation step for each thesaurus of calculating the total of the correlation coefficients for each thesaurus; a correlation-coefficient-total-memory step for each thesaurus of storing the total of the correlation coefficients for each thesaurus calculated in the correlation-coefficient-total-calculation step for each thesaurus; and a graph-creation-display step of creating and displaying a graph based on the frequency of appearance stored in the frequency-of-appearance-memory step and the correlation-coefficient totals for each thesaurus stored in the correlation-coefficient-total-memory step for each thesaurus.

An information-processing program is executed on a computer to perform: an input step of inputting text data; a text-data-memory step of storing text data; a word-cutting step of executing a word-cutting process on text data; a syntax-analysis step of performing a syntax-analysis process on the text data on which the word-cutting process was performed; a thesaurus-creation step of creating thesauruses from the text data on which the syntax-analysis process was performed; a thesaurus-memory step of storing the thesauruses created in the thesaurus-creation step; a word-cutting and syntax-analysis step of performing the word-cutting process and syntax-analysis process again based on the thesauruses stored in the thesaurus-memory step; a thesaurus-sorting step of performing a sorting process on the text data on which word-cutting and syntax-analysis were performed; a sorting-results-memory step of storing the sorting results from the thesaurus-sorting step; a frequency-of-appearance-calculation step of calculating the frequency of appearance for each thesaurus based on the sorting results stored in the sorting-results-memory step; a frequency-of-appearance-memory step of storing the results calculated in the frequency-of appearance-calculation step; a correlation-coefficient-calculation step of calculating correlation coefficients between thesauruses; a correlation-coefficient-memory step of storing the correlation coefficients between thesauruses that were calculated in the correlation-coefficient-calculation step; a correlation-coefficient-total-calculation step for each thesaurus of calculating the total of the correlation coefficients for each thesaurus; a correlation-coefficient-total-memory step for each thesaurus of storing the total of the correlation coefficients for each thesaurus calculated in the correlation-coefficient-total-calculation step for each thesaurus; and a graph-creation-display step of creating and displaying a graph based on the frequency of appearance stored in the frequency-of-appearance-memory step and the correlation-coefficient totals for each thesaurus stored in the correlation-coefficient-total-memory step for each thesaurus.

Effect of the Invention

The information-processing apparatus, information-processing method and information-processing program of this invention are such that: an input step inputs text data; a text-data-memory step stores text data; a word-cutting step executes a word-cutting process on text data; a syntax-analysis step performs a syntax-analysis process on the text data on which the word-cutting process was performed; a thesaurus-creation step creates thesauruses from the text data on which the syntax-analysis process was performed; a thesaurus-memory step stores the thesauruses created in the thesaurus-creation step; a word-cutting and syntax-analysis step performs the word-cutting process and syntax-analysis process again based on the thesauruses stored in the thesaurus-memory step; a thesaurus-sorting step performs a sorting process on the text data on which word-cutting and syntax-analysis were performed; a sorting-results-memory step stores the sorting results from the thesaurus-sorting step; a frequency-of-appearance-calculation step calculates the frequency of appearance for each thesaurus based on the sorting results stored in the sorting-results-memory step; a frequency-of-appearance-memory step stores the results calculated in the frequency-of appearance-calculation step; a correlation-coefficient-calculation step calculates correlation coefficients between thesauruses; a correlation-coefficient-memory step stores the correlation coefficients between thesauruses that were calculated in the correlation-coefficient-calculation step; a correlation-coefficient-total-calculation step for each thesaurus calculates the total of the correlation coefficients for each thesaurus; a correlation-coefficient-total-memory step for each thesaurus stores the total of the correlation coefficients for each thesaurus calculated in the correlation-coefficient-total-calculation step for each thesaurus; and a graph-creation-display step creates and displays a graph based on the frequency of appearance stored in the frequency-of-appearance-memory step and the correlation-coefficient totals for each thesaurus stored in the correlation-coefficient-total-memory step for each thesaurus, so it is possible to extract the characteristics of text data based on the frequency of appearance of and correlation between thesauruses created from keywords extracted from the text data, and to analogize potential hidden meaning in the text data.

BRIEF DESCRIPTION OF THE DRAWINGS

FIG. 3 is a drawing showing an example of a thesaurus having a collection of synonyms.

FIG. 4 is a drawing showing the sorting results for each thesaurus.

FIG. 5 is a drawing showing the correlation coefficients for each thesaurus.

FIG. 6 is a drawing showing the frequency of appearance of each thesaurus.

DESCRIPTION OF THE PREFERRED EMBODIMENT

Figure 1:
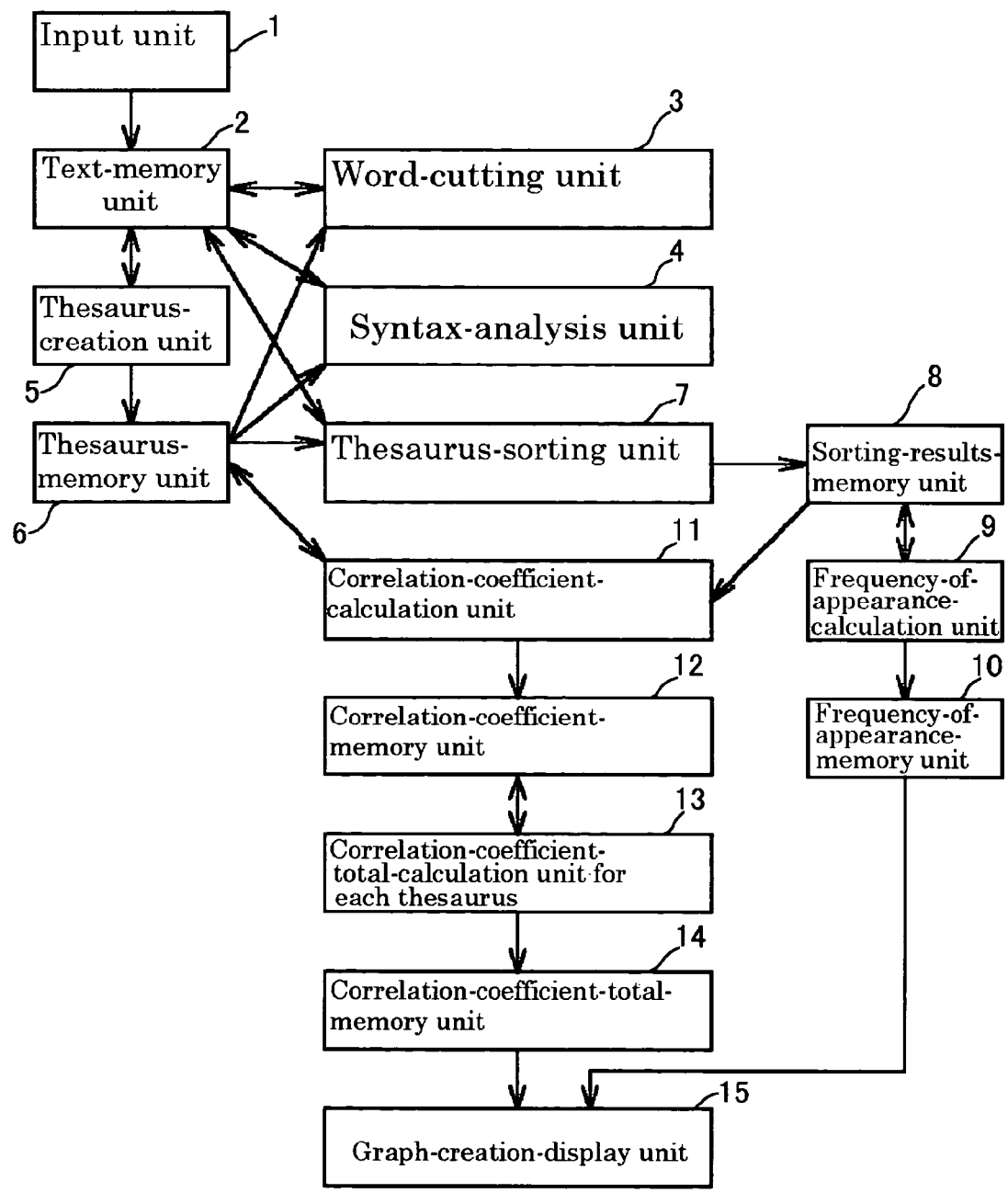
FIG. 1 is a block diagram showing the function of a first embodiment of the information-processing apparatus of the invention.

FIG. 1 is a block diagram showing the function of an embodiment of the information-processing apparatus of the invention. This embodiment comprises a personal computer or the like. As shown in the same figure, the embodiment is functionally constructed of the following blocks. The processing of each block is actually executed by a specified application program, and each memory unit is made possible by a hard disc that is not shown in the figure.

The function of each of the blocks will be briefly explained. The input unit 1 is used to input text data that is then stored in the text-memory 2. The word-cutting unit 3 executes a word-cutting process on the text data stored in the text-memory unit 2. The syntax-analysis unit 4 performs syntax analysis on the text data for which the word cutting process was performed.

The thesaurus-creation unit 5 creates a thesaurus from the text data stored in the text-memory unit 2. The thesaurus-memory unit 6 stores the created thesaurus. The thesaurus-sorting unit 7 performs the sorting process on all samples for each thesaurus. The sorting-results-memory unit 8 stores the sorting results. The frequency-of-appearance-calculation unit 9 calculates the frequency of appearance in each thesaurus based on the data stored in the sorting-results-memory unit 8. The frequency-of-appearance-memory unit 10 stores the result calculated by the frequency-of-appearance-calculation unit 9.

The correlation-coefficient-calculation unit 11 calculates the correlation coefficient between thesauruses. The correlation-coefficient-memory unit 12 stores the correlation coefficient calculated by the correlation-coefficient-calculation unit 11. The correlation-coefficient-total-calculation unit 13 for each thesaurus totals the found correlation coefficients for each thesaurus. The correlation-coefficient-total-memory unit 14 for each thesaurus stores the correlation-coefficient total for each thesaurus that was calculated by the correlation-coefficient-total-calculation unit 13 for each thesaurus. The graph-creation-display unit 15 creates and displays a graph based on the frequency of appearance stored in the frequency-of-appearance-memory unit 10 and the correlation-coefficient totals for each thesaurus that are stored in the correlation-coefficient-total-memory unit 14 for each thesaurus.

Figure 2:
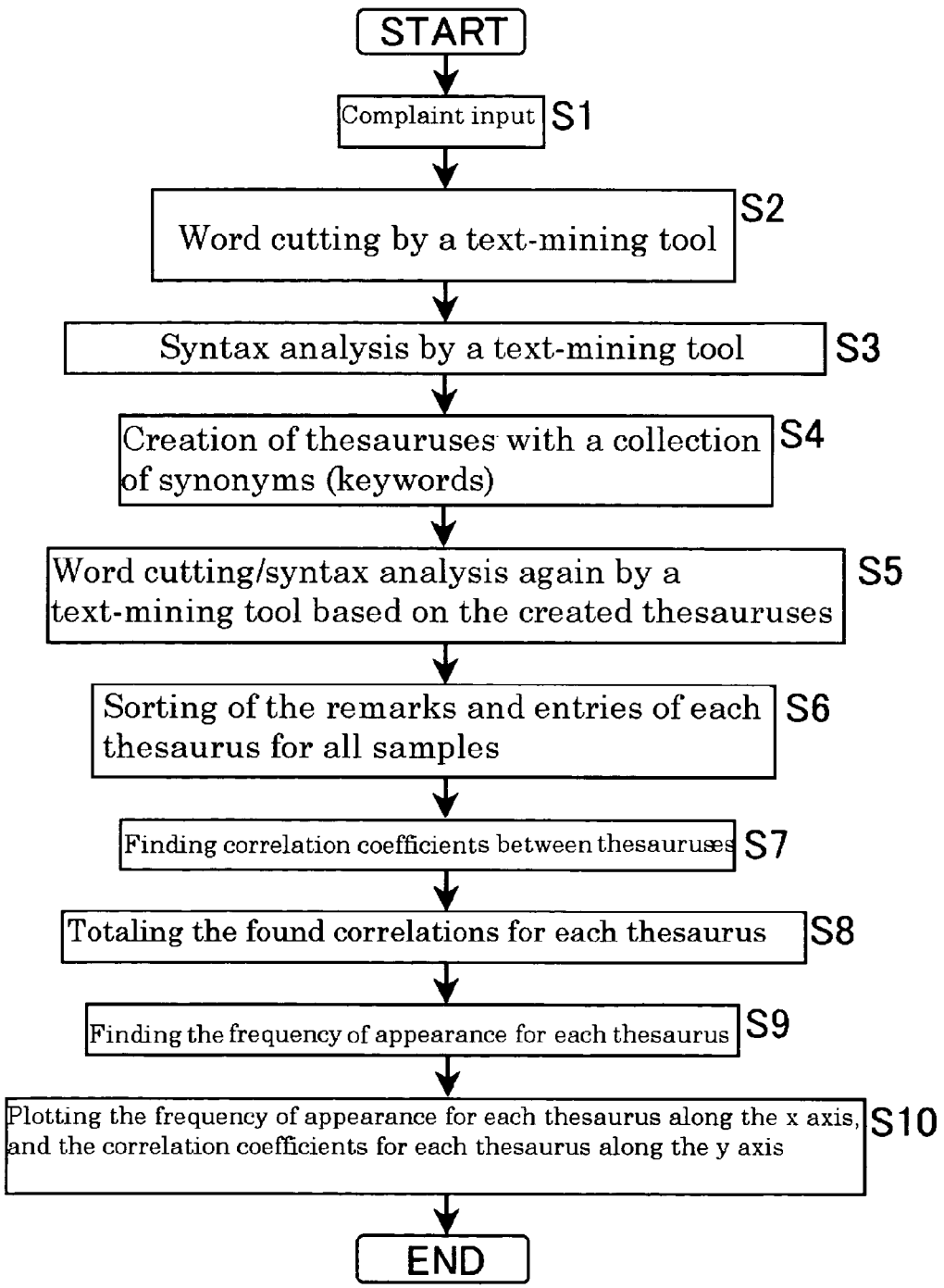
FIG. 2 is a flowchart for explaining the processing procedure of an embodiment of the invention.

Next, the processing procedure of this embodiment will be explained with reference to the flowchart shown in FIG. 2. Here, the case of analyzing text data of complaints or demands from customers will be explained. First, in step S1, text data from each customer is input from the input unit 1. For example, suppose that the complaint from one customer, 'Last week, I ordered a part, but it has not been delivered yet.' is input. The input text data is stored in the text-memory unit 2.

Next, in step S2, the word-cutting unit 3 performs a word-cutting process using a specified text-mining tool (application software). For example, the text above becomes 'Last week I ordered a part, but it has not been delivered yet.'

Next, in step S3, the syntax-analysis unit 4 performs a syntax-analysis process using a text-mining tool. For example, the text above becomes 'Last week I ordered a part but, it has not been delivered yet.'

Next, in step S4, the thesaurus-creation unit 5, creates a thesaurus with a collection of synonyms (keywords). For example, as shown in FIG. 3, synonyms or keywords such as 'one week ' are collected in the 'last week' thesaurus. Also, keywords such as 'ordered, but' are collected in the 'order' thesaurus. Also, keywords such as 'deliver' are collected in the 'deliver' thesaurus. Also, keywords such as 'parts' are collected in the 'parts' thesaurus. Also, keywords such as 'information' are collected in the 'contact' thesaurus. The created thesauruses are stored in the thesaurus-memory unit 6.

Next, in step S5, the word-cutting unit 3 performs the word-cutting process again based on the thesauruses created now and stored in the thesaurus-memory unit 6, and the syntax-analysis unit 4 performs the syntax-analysis process again.

Next, in step S6, the thesaurus-sorting unit 7 performs sorting of the contents of the text data from all customers for each thesaurus. For example, '1' is set for all of the thesauruses that are contained in text data such as a complaint from a user, for each user, and sets '0' for the thesauruses that are not contained. The sorting results are stored in the sorting-results-memory unit 8.

FIG. 4 shows the sorting results that are stored in the sorting-results-memory unit 8. In the figure, 'K-1', 'K-2', 'K-3', . . . 'K-n' indicate ID numbers that identify the customer. In this example, it can be seen that text data containing keywords contained in the 'order' and 'parts' thesauruses was input by customer K-1.

Next, in step S7, the correlation-coefficient-calculation unit 11 finds correlation coefficients between thesauruses. For example, the correlation coefficient for 'order' and 'deliver' is expressed by the following equation.

Correlation coefficient $r_{order-delivery} = (S_{order-delivery})/(S_{order} \cdot S_{delivery})$ Where $S_{order-delivery}$ is the covariance, and $S_{order}$ and $S_{delivery}$ are each standard deviations.

Covariance $S_{order-delivery} = ((order_1 - order)(delivery_1 - delivery) + (order_2 - order)(delivery_2 - delivery) + \ldots + (order_n - order)(delivery_n - delivery))/(n-1)$ Standard deviation $S_{order} = ((order_1 - order)^2 + (order_2 - order)^2 + \ldots + (order\ n - order)^2)/(n-1)$ Standard deviation $S_{delivery} = ((delivery_1 - delivery)^2 + (delivery_2 - delivery)^2 + \ldots + (delivery\ n - delivery)^2)/(n-1)$ Similarly, correlation coefficients are found between all of the thesauruses, and stored in the correlation-coefficient-memory unit 12. FIG. 5 shows the correlation coefficients between the thesauruses. For example, the correlation coefficient between the thesaurus 'last week' and the thesaurus 'order' is 0.025. The correlation coefficient between identical thesauruses is 1.

Next, in step S8, the correlation-coefficient-total-calculation unit 13 for each thesaurus totals the correlation coefficients stored in the correlation-coefficient-memory unit 12 for each thesaurus. For example, in the case of the thesaurus 'last week', the total is 1+0.025+0.038+0.001+ . . . When doing this, the correlation coefficient 1 between identical thesauruses is omitted. Similarly, the correlation-coefficient totals are found for the other thesauruses such as 'order', 'deliver', 'parts', etc. The correlation-coefficient totals that were found for each of the thesauruses are stored in the correlation-coefficient-total-memory unit 14 for each thesaurus.

Next, in step S9, the frequency-of-appearance-calculation unit 9 finds the frequency of appearance for each thesaurus. That is, as shown in FIG. 6, the frequency of appearance for each thesaurus is found based on the sorting results (FIG. 4) for each thesaurus. In the example of FIG. 6, for example, for the thesaurus 'last week', it is seen that that thesaurus 'last week' is contained in the text data of the complaints from customers K-2, K-3, . . . K-n. By totaling the values for each customer for the thesaurus 'last week', the number of appearances A is calculated. Similarly, the number of appearances for thesaurus 'order' is B, the number of appearances for thesaurus 'deliver' is C and the number of appearances for thesaurus 'parts' is D. The total number of appearances for all of the thesauruses $\Sigma(A+B+C+D+ \ldots)$ is found, and the frequency of appearance for each thesaurus is expressed as a percentage.

For example, the frequency of appearance of the thesaurus 'last week' is $(A/\Sigma(A+B+C+D+ \ldots))*100(\%)$. The calculated frequencies of appearance for each of thesauruses are stored in the frequency-of-appearance-memory unit 10.

Figure 7:
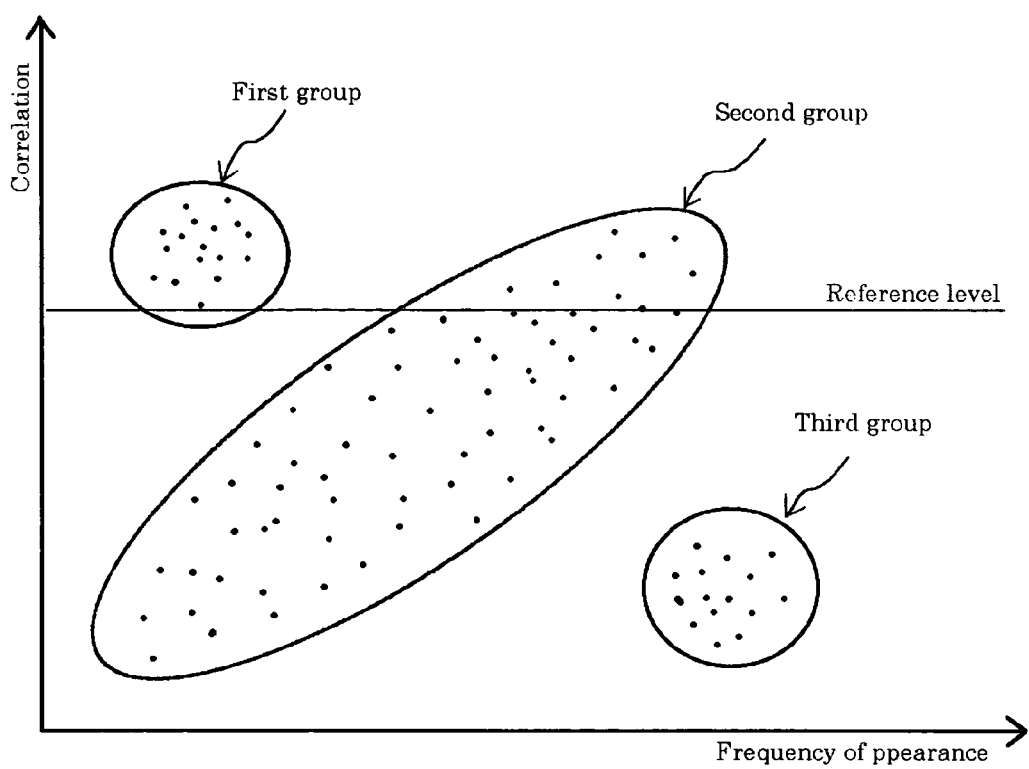
FIG. 7 is a graph showing the relationship between the frequency of appearance and the correlation coefficients of each thesaurus.

Next, in step S10, the graph-creation-display unit 15 plots the frequency of appearance (%) for each thesaurus along the x-axis, and the correlation coefficient totals for each thesaurus along the y-axis, to create a graph. FIG. 7 shows the created graph.

As shown in FIG. 7, in the complaints from customers, thesauruses whose number of appearances is not so large but whose connection (some kind of relationship) with other thesauruses is large appear in the first group.

Also, thesauruses that do not have such a strong connection with other thesauruses but whose number of appearances is large, or in other words, thesauruses that cannot be ignored because they are mentioned frequently, appear in the third group.

Here, significance is not found based on the size of the value of the correlation coefficient, but a fixed level is set as a reference, and it is determined that there is a strong connection when the correlation exceeds that reference level, and it is determined that the connection is weak when the correlation is below that level.

Whether or not the y-coordinate value exceed a fixed level is important, and for thesauruses that exceed a fixed level, there is a high possibility that there is some significance when connected with other keywords. In this case, since the text is a complaint from a customer concerning a part, this 'significance' is a complaint, or in other words, it can be analogized that it indicates a 'potential dissatisfaction'.

The construction and operation of the embodiment described above are examples, and needless to say, can be suitably changed within a range that does not deviate from the object of the invention.

DESCRIPTION OF REFERENCE NUMBERS

1 Input unit
2 Text-memory unit
3 Word-cutting unit
4 Syntax-analysis unit
5 Thesaurus-creation unit
6 Thesaurus-memory unit
7 Thesaurus-sorting unit
8 Sorting-results-memory unit
9 Frequency-of-appearance-calculation unit
10 Frequency-of-appearance-memory unit 11 Correlation-coefficient-calculation unit
12 Correlation-coefficient-memory unit
13 Correlation-coefficient-total-calculation unit for each thesaurus
14 Correlation-coefficient-total-memory unit for each thesaurus
15 Graph-creation-display unit

What is claimed is:

1. An information-processing apparatus comprising:
an input unit that inputs text data;
a text-data-memory unit that stores said text data;
a word-cutting unit that executes a word-cutting process on said text data;
a syntax-analysis unit that performs a syntax-analysis process on said text data on which said word-cutting process was performed;
a thesaurus-creation unit that creates thesauruses from said text data on which said syntax-analysis process was performed;
a thesaurus-memory unit that stores said thesauruses created by said thesaurus-creation unit;
a thesaurus-sorting unit that performs a sorting process on said text data on which said word-cutting and said syntax-analysis were performed;
a sorting-results-memory unit that stores the sorting results from said thesaurus-sorting unit;
a frequency-of-appearance-calculation unit that calculates the frequency of appearance for each thesaurus based on said sorting results stored by said sorting-results-memory unit;
a frequency-of-appearance-memory unit that stores the results calculated by said frequency-of appearance-calculation unit;
a correlation-coefficient-calculation unit that calculates correlation coefficients between thesauruses;
a correlation-coefficient-memory unit that stores the correlation coefficients between thesauruses that were calculated by said correlation-coefficient-calculation unit;
a correlation-coefficient-total-calculation unit for each thesaurus that calculates the total of the correlation coefficients for each thesaurus;
a correlation-coefficient-total-memory unit for each thesaurus that stores the total of the correlation coefficients for each thesaurus calculated by the correlation-coefficient-total-calculation unit for each thesaurus; and
a graph-creation-display unit that creates and displays a graph based on the frequency of appearance stored by the frequency-of-appearance-memory unit and the correlation-coefficient totals for each thesaurus stored by the correlation-coefficient-total-memory unit for each thesaurus; and wherein
said word-cutting unit and said syntax-analysis unit perform said word-cutting process and said syntax-analysis process again based on said thesauruses created by said thesaurus-creation unit.

2. An information-processing method comprising:
an input step of inputting text data;
a text-data-memory step of storing said text data;
a word-cutting step of executing a word-cutting process on said text data;
a syntax-analysis step of performing a syntax-analysis process on said text data on which said word-cutting process was performed;
a thesaurus-creation step of creating thesauruses from said text data on which said syntax-analysis process was performed;
a thesaurus-memory step of storing said thesauruses created in said thesaurus-creation step;
a word-cutting and syntax-analysis step of performing said word-cutting process and said syntax-analysis process again based on said thesauruses stored in said thesaurus-memory step;
a thesaurus-sorting step of performing a sorting process on said text data on which said word-cutting and said syntax-analysis were performed;
a sorting-results-memory step of storing the sorting results from said thesaurus-sorting step;
a frequency-of-appearance-calculation step of calculating the frequency of appearance for each thesaurus based on said sorting results stored in said sorting-results-memory step;
a frequency-of-appearance-memory step of storing the results calculated in said frequency-of appearance-calculation step;
a correlation-coefficient-calculation step of calculating correlation coefficients between thesauruses;
a correlation-coefficient-memory step of storing the correlation coefficients between thesauruses that were calculated in the correlation-coefficient-calculation step;
a correlation-coefficient-total-calculation step for each thesaurus of calculating the total of the correlation coefficients for each thesaurus;
a correlation-coefficient-total-memory step for each thesaurus of storing the total of the correlation coefficients for each thesaurus calculated in the correlation-coefficient-total-calculation step for each thesaurus; and
a graph-creation-display step of creating and displaying a graph based on the frequency of appearance stored in the frequency-of-appearance-memory step and the correlation-coefficient totals for each thesaurus stored in the correlation-coefficient-total-memory step for each thesaurus.

* * * * *